US009281951B2

United States Patent
Asati et al.

(10) Patent No.: US 9,281,951 B2
(45) Date of Patent: Mar. 8, 2016

(54) ANY-TO ANY MULTICASTING IN A TUNNEL BASED VIRTUAL PRIVATE NETWORK

(75) Inventors: Rajiv Asati, Morrisville, NC (US); Mohamed Khalid, Cary, NC (US); Manikchand R. Bafna, Kumarapark West Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1198 days.

(21) Appl. No.: 12/315,454

(22) Filed: Dec. 3, 2008

(65) Prior Publication Data

US 2010/0135294 A1    Jun. 3, 2010

(51) Int. Cl.
*H04L 12/18*    (2006.01)
*H04L 12/761*    (2013.01)

(52) U.S. Cl.
CPC ............ *H04L 12/18* (2013.01); *H04L 45/16* (2013.01); *H04L 2212/00* (2013.01)

(58) Field of Classification Search
USPC ................. 370/390, 216, 229, 237, 395.31; 713/153
See application file for complete search history.

(56) References Cited

U.S. PATENT DOCUMENTS

| | | | |
|---|---|---|---|
| 7,447,901 B1 | 11/2008 | Sullenberger et al. | |
| 2003/0112808 A1* | 6/2003 | Solomon | 370/400 |
| 2003/0223372 A1* | 12/2003 | Sanchez et al. | 370/237 |
| 2006/0088031 A1* | 4/2006 | Nalawade | 370/390 |
| 2006/0193329 A1 | 8/2006 | Asati et al. | |
| 2006/0291444 A1* | 12/2006 | Alvarez et al. | 370/351 |
| 2007/0115990 A1 | 5/2007 | Asati et al. | |
| 2007/0140107 A1* | 6/2007 | Eckert et al. | 370/216 |
| 2007/0206597 A1 | 9/2007 | Asati et al. | |
| 2007/0271451 A1* | 11/2007 | Fluhrer | 713/150 |
| 2008/0229095 A1* | 9/2008 | Kalimuthu et al. | 713/153 |
| 2009/0135820 A1* | 5/2009 | Suzuki | 370/390 |
| 2009/0304004 A1* | 12/2009 | Huynh Van et al. | 370/395.31 |

* cited by examiner

*Primary Examiner* — Dang Ton
*Assistant Examiner* — Mandish Randhawa
(74) *Attorney, Agent, or Firm* — Hickman Palermo Becker Bingham LLP

(57) ABSTRACT

Systems, methods, and other embodiments associated with any-to-any multicasting in a tunnel based virtual private network (VPN) are described. One example method includes calculating a resolved address for an unknown reverse path forwarding (RPF) neighbor in an any-to-any multicasting route. The resolved address is calculated using next hop resolution protocol (NHRP) resolution. The address is to be resolved based on control plane traffic. The NHRP address resolution is not to affect unicast routing. The example method may also include establishing the any-to-any multicasting route. Since the multicasting route is any-to-any (e.g., spoke-to-spoke), the multicasting route is not required to include a hub in the logical hub-and-spoke network.

31 Claims, 8 Drawing Sheets

ANY-TO ANY MULTICASTING IN A TUNNEL BASED VIRTUAL PRIVATE NETWORK

BACKGROUND

Dynamic multipoint virtual private networks (DMVPN) are increasingly popular among network operators. In a DMVPN, the members of a virtual private network (VPN) can communicate with each other in an any-to-any fashion over an Internet Protocol (IP) cloud. This any-to-any communication only requires the IP cloud to be able to unicast, even to support both unicast and multicast among the VPN members. DMVPN uses IP tunneling techniques including generic routing encapsulation (GRE) to tunnel the VPN traffic through shared network infrastructure including, for example, the Internet. An IP tunnel between two spoke routers may be created on an as-needed basis to directly exchange the data traffic. This alleviates the need for the hub router to route 'unicast' data between spoke networks. This need was common in a non-fully meshed frame relay topology, which resulted in a temporal full mesh logical topology for unicast data forwarding.

The desire to distribute content (e.g., video, audio, real-time meeting feeds) using multicasting is becoming more popular among DMVPN operators. In a conventional hub-and-spoke network configuration, multicasting between spokes typically includes sending all multicasting traffic, both control plane and data plane traffic, through the hub. In the context of DMVPN, this is due in part to the fact that the next hop routing protocol (NHRP) forces spokes to map outgoing multicast traffic to an NHRP server, which is typically implemented at the hub. At one time this was practical because the computer resources (e.g., processor power, bandwidth, memory) used in an NHRP server and multicast distribution point were limited and expensive. However, as resources become more available and/or less expensive, the rationale for routing all multicast traffic through a hub may no longer be compelling and even disadvantageous due to the added latency. Furthermore, it may no longer be reasonable to prohibit a hub-and-spoke network and/or a DMVPN implemented on a hub-and-spoke network from adopting a product independent multicast (PIM) source specific multicast (SSM) approach.

In a unicast situation, traffic from a first location that is intended for a second location may arrive at a spoke router. The second location may be associated with an IP address that lies beyond the spoke site. The fact that the IP address lies beyond the spoke site may trigger an address resolution action. In one example, if a route to the second location is already known and resolved, then the next hop and/or the corresponding resolved address may simply be looked up in a routing table, a routing information base (RIB), an NHRP database, and so on. However, if the route is not resolved, then an NHRP resolution action may be used to resolve the address. As addresses and routes are learned, data structures in routers may be updated with the acquired knowledge. In the unicast situation, at boot time, a spoke router only has knowledge of a hub. The spoke router only learns about other spokes when it receives traffic of interest. This traffic of interest may lead to a spoke router becoming aware of the IP address of other spokes. These addresses may be stored in a knowledge base (e.g., table) of IP addresses.

In a multicast situation, a receiver may wish to signal its desire to receive content for a multicast group or channel from a sender. Multiple receivers may wish to receive content from the sender. For example, audio and video of a real-time shareholder's meeting may be available from a sender. Many receivers (e.g., shareholders) may wish to receive this audio and video. A computer associated with a receiver may send a Join Group message to its spoke router. Conventionally, the spoke router may have taken actions associated with unicast traffic to establish a route from the sender to the receiver. Typically, these actions included resolving an address using a reverse path forwarding (RPF) check. Resolving the address for multicast using this unicast approach has typically not included triggering an NHRP action. Instead, the resolving has simply involved finding a route that traversed the hub using unicast tables. Therefore, spoke-to-spoke multicast traffic typically included the hub, resulting in a hub-and-spoke logical topology for multicast data forwarding.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Figure 1:
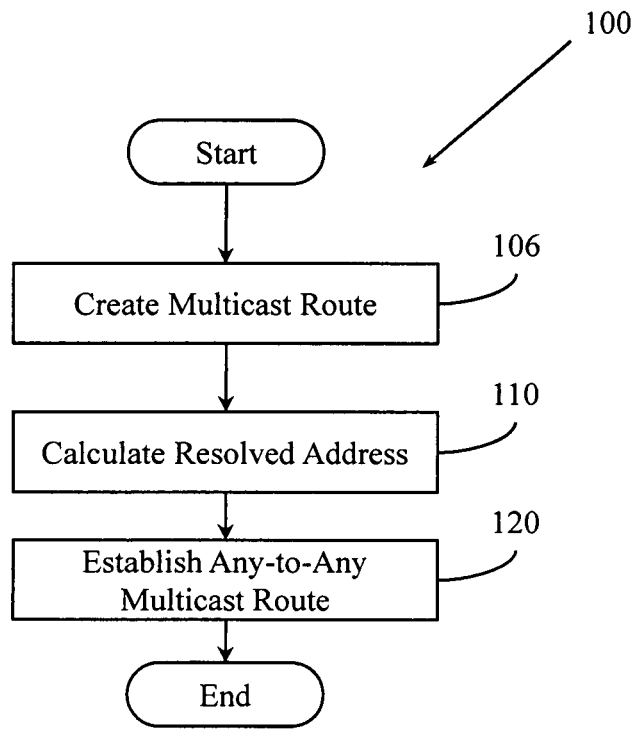
FIG. 1 illustrates an example method associated with any-to-any multicasting in a tunnel-based virtual private network.

Example systems and methods described herein facilitate any-to-any multicasting, including spoke-to-spoke multicasting, in a logical hub-and-spoke network configuration that employs tunnel-based forwarding. In one embodiment, spoke-to-spoke multicasting is supported for a dynamic multipoint virtual private network (DMVPN) that uses generic routing encapsulation (GRE) to support tunnel-based forwarding. Example systems and methods calculate a reverse path forwarding (RPF) neighbor for a multicast route using the next hop resolution protocol (NHRP) rather than just using the unicast routing table. Example systems and methods may use modified protocol independent multicasting (PIM) processing coupled with NHRP resolution to calculate an RPF neighbor. Example systems and methods do not change conventional unicasting in a DMVPN using PIM and NHRP and also do not change PIM messages. Since different spokes may have different processing power and/or bandwidth, in one embodiment, hub and spoke routers may be configured to selectively employ example systems and methods or to selectively employ conventional approaches.

In one example, NHRP resolution is triggered based on control plane traffic rather than on data plane traffic. The control plane traffic may be, for example, a PIM join, an Internet Group Management Protocol (IGMP) join, and so on. Thus, in example systems and methods, an NHRP resolution action is triggered by a message (e.g., join) being received at its intended destination (e.g., router) rather than based on data plane traffic arriving at a location (e.g., router) other than its intended destination. By way of illustration, a computer may want to receive information associated with a multicast group. This receiver may be a computer associated with a first spoke in a DMVPN. The receiver may send a join group message to a spoke router closer to the receiver. This join group message will result in the creation of one or more multicast routes that will include at least one outgoing interface towards the receiver and one incoming interface referred to as the RPF interface towards the RPF neighbor. The multicast route may be updated, at least in part, using NHRP resolution. In one example, the join group message may be a PIM-SSM message associated with an (S, G) multicast route, where S refers to the IP address of a multicast source or sender, and where G identifies a multicast group. In another example, the join group message may be a PIM-SM message associated with an (*, G) multicast route, where * refers to any source known to the rendezvous point (RP), and where G identifies a multicast group. After creating the multicast route, the spoke router will determine the RPF neighbor and RPF interface for the S (or RP, in case of PIM-SM) by executing multicast-specific NHRP resolution in one of two ways, both of which are different than conventional RPF neighbor determination. One skilled in the art will appreciate that while embodiments describing PIM-SSM are provided, that embodiments associated with PIM-SM are contemplated.

In a first embodiment, the spoke router executes the NHRP resolution for the IP (Internet Protocol) address associated with the next-hop of S or RP. The spoke router looks up the local NHRP database to find the resolved IP address for the next-hop. If the spoke router does not find a matching entry, then the spoke router sends a multicast specific NHRP resolution request message to a hub. The hub may then provide the resolved IP address in an NHRP Resolution Response message to the spoke router associated with the receiver. The spoke router associated with the receiver uses the resolved IP address as that of the RPF neighbor. The spoke router associated with the receiver may then establish a tunnel to the RPF neighbor, which may be another spoke router associated with the sender. Internet Protocol Security (IPsec) may selectively be established between the routers. The router associated with the receiver may then encapsulate the join message and forward the join message directly to the router associated with the sender. In one example, the encapsulation may be GRE encapsulation. The router associated with the sender and the router associated with the receiver will update database(s) associated with NHRP, unicast routing, multicast routing, and so on. The multicast route is updated to have the outgoing interface identify the router associated with the receiver.

In a second embodiment, the spoke router executes the NHRP resolution for the S. The spoke router looks up the local NHRP database to find the resolved IP address for the S. If the spoke router doesn't find a matching entry, then it sends a multicast specific NHRP resolution request message to a hub. The hub may forward the request message to the router associated with the sender. The router associated with the sender may then directly provide its resolved IP address in the NHRP Resolution Response message to the router associated with the receiver. The router associated with the sender and the router associated with the receiver will update their database(s) associated with NHRP, unicast routing, and so on. The router associated with the receiver may then establish a tunnel to the router associated with the sender. In one example, the encapsulation may be GRE encapsulation. The router associated with the receiver may then encapsulate the join message and forward the join message directly to the router associated with the sender. The router associated with the sender will create or update the multicast route so that the outgoing interface identifies the router associated with the receiver.

Note that the spoke routers may be the RPF neighbors of each other in the context of a multicast route. However, the spoke routers are not PIM neighbors. The example systems and methods facilitate a PIM join being sent to an RPF neighbor even if the RPF neighbor is not the PIM neighbor. Additionally, the hub may not appear in the multicast route, though the hub maintains the PIM neighbor relationship with the spoke router associated with sender and receiver. The hub checks for the PIM neighbor relationship with the spoke router before forwarding or responding to the multicast specific NHRP resolution request. This ensures the successful processing of multicast data on the eligible incoming and outgoing interfaces at the spoke router in any-to-any manner.

DETAILED DESCRIPTION

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with any-to-any multicasting in a tunnel-based virtual private network. Method 100 includes, at 106, creating a multicast route. One skilled in the art will appreciate that in some examples the multicast route may already have been created using traditional approaches. Method 100 may include, at 110, calculating a resolved address for an unresolved reverse path forwarding (RPF) neighbor in a multicasting route in a logical hub-and-spoke network that employs tunnel-based forwarding. The RPF neighbor address is calculated using next hop resolution protocol (NHRP) resolution. The NHRP resolution is executed for multicasting usage. Thus, rather than simply performing an action similar to a unicast action (e.g., table lookup), additional actions will be taken. In one example, the any-to-any multicasting is leveraged to establish a spoke-to-spoke multicasting route that enables a receiver located behind a first spoke router to receive multicast data directly from a sender located behind a second spoke router. In one example, the receiver of multicast data and the sender of multicast data are members of a dynamic multipoint virtual private network (DMVPN). The spoke router may be statically configured so that the multicast route is created at the spoke router. The output interface of the multicast route identifies the receiver that desires to receive multicast data from the sender of the multicast data. For example, a receiver may desire to watch the shareholder's meeting for which audio and video content is available and multicast through the DMVPN. The content may be forwarded from one DMVPN spoke site to another using tunneling. Different tunnel-based forwarding approaches may be employed. In one example, the tunnel-based forwarding is Generic Routing Encapsulation (GRE) based tunneling.

There are at least two different approaches for resolving the address at 110. In a first example, processing is confined to a hub. In another example, both the hub and the router associated with the sender of multicast data cooperate to resolve the address. Thus, in a first example, the NHRP resolution request message is provided to the hub in the hub-and-spoke network. The hub may then selectively provide the resolved address to the router associated with the receiver. In a second example, calculating a resolved address for an unknown RPF neighbor may include sending the NHRP resolution request message to the hub in the hub-and-spoke network and then having the hub selectively forward the message to the router associated with the sender of multicast data. The router associated with the sender of multicast data may then be controlled to provide the resolved address to the router associated with the receiver of multicast data. Calculating the resolved address may conclude with receiving the resolved address in an NHRP resolution response message from the router associated with the sender of multicast data. The NHRP message is multicast-specific.

Method 100 may also include, at 120, establishing the any-to-any multicasting route. Note that the any-to-any multicasting route does not need to include a hub. In one example, establishing the any-to-any multicasting route includes selectively establishing Internet Protocol Security (IPsec) between the router associated with the receiver of multicast data and the router associated with the sender of multicast data. It may be determined not to establish IPsec, and thus IPsec is only selectively established. Establishing the route also includes encapsulating the join group message into an encapsulated join group message. Different types of encapsulation may be employed. In one example, the encapsulation may be GRE based. Establishing the route also includes providing the encapsulated join group message to the router associated with the sender of multicast data. The IP address to which the encapsulated join group message is sent will be based, at least in part, on the resolved address.

While FIG. 1 illustrates various actions occurring in serial, it is to be appreciated that various actions illustrated in FIG. 1 could occur substantially in parallel. By way of illustration, a first process could calculate a resolved address while a second process could establish the any-to-any multicast route. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. "Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

While executable instructions associated with the above method are described as being stored on a computer-readable medium, it is to be appreciated that executable instructions associated with other example methods described herein may also be stored on a computer-readable medium. The example methods may be stored as "software", rather than as non-functional descriptive material. "Software", as used herein, includes but is not limited to, executable instructions that cause a computer, processor, or other electronic device to perform functions, actions and/or behave in a desired manner. "Software" does not refer to stored instructions being claimed as stored instructions per se (e.g., a program listing). Compiled, assembled, and/or pre-interpreted instructions that are executable by a machine and that cause the machine to become a "special purpose computer" are clearly not merely non-functional descriptive material. The instructions may be embodied in various forms including routines, algorithms, modules, methods, threads, and/or programs including separate applications or code from dynamically linked libraries.

Figure 2:
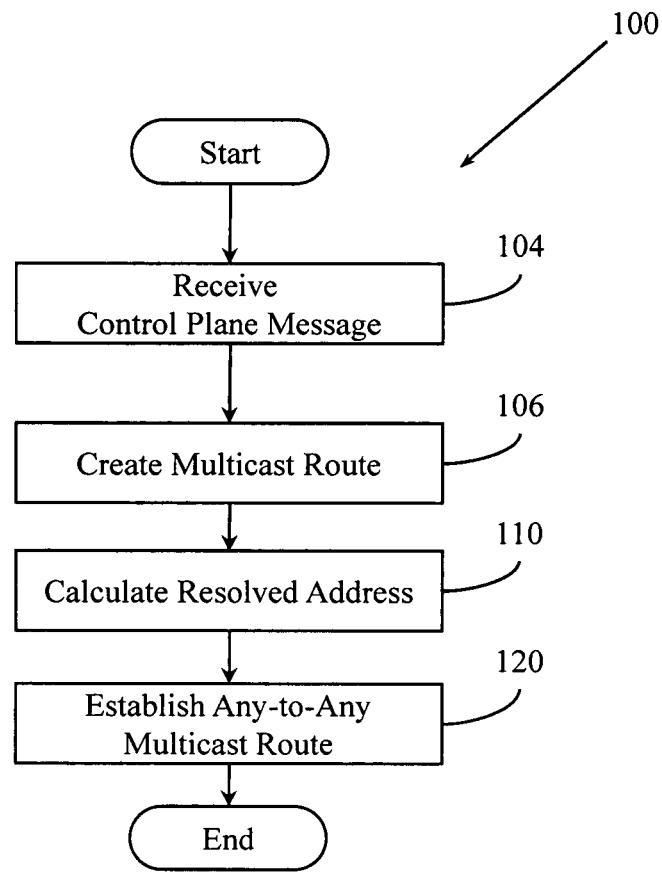
FIG. 2 illustrates an example method associated with any-to-any multicasting in a tunnel-based virtual private network.

FIG. 2 illustrates another embodiment of method 100. This embodiment includes actions similar to those described in connection with the embodiment of FIG. 1. For example, this embodiment of method 100 includes creating the multicast route at 106, calculating the resolved address at 110 and establishing the route at 120. Recall that the multicast route may already have been created using traditional approaches. However, this embodiment of method 100 includes an additional action.

This embodiment of method 100 also includes, at 104, receiving a control plane message associated with establishing the any-to-any multicasting route. In one example, the control plane message is a join group message. The join group message may be, for example, a protocol independent multicast (PIM) join group message, an Internet Group Management Protocol (IGMP) join group message, and so on. Thus the NHRP resolution is triggered by a message (e.g., join group) arriving at its intended target (e.g., router associated with receiver of multicast data). This differs from conventional systems where address resolution may be triggered by a data plane message being received at a location other than its destination.

Figure 3:
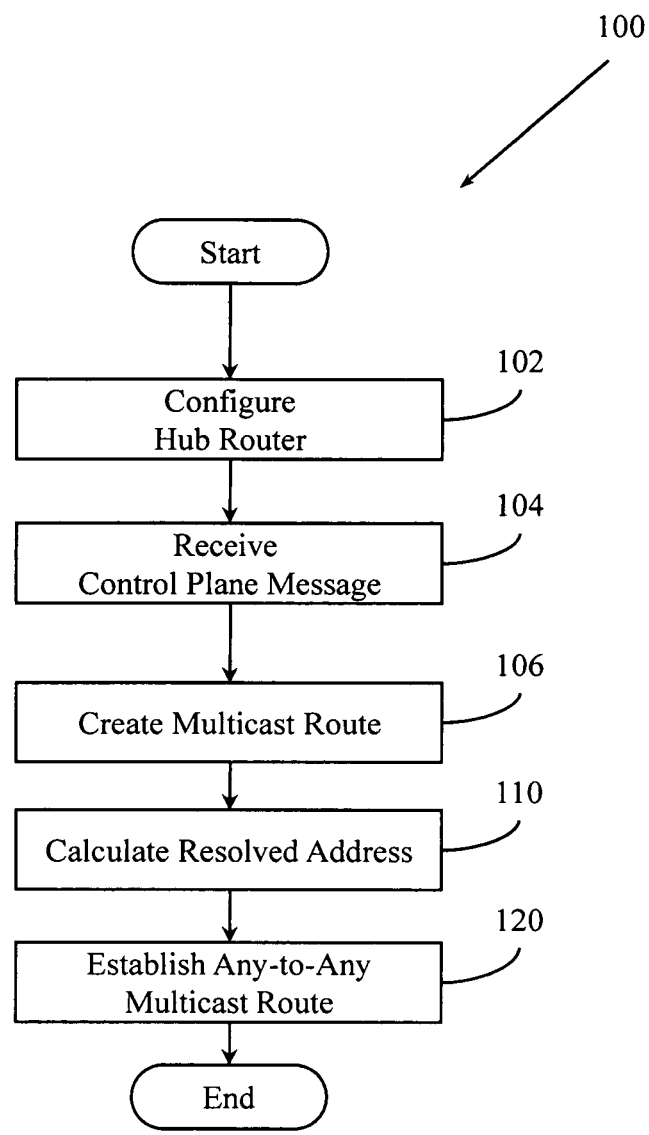
FIG. 3 illustrates an example method associated with any-to-any multicasting in a tunnel-based virtual private network.

FIG. 3 illustrates another embodiment of method 100. This embodiment includes actions similar to those described in connection with the embodiment of FIG. 2. For example, this embodiment of method 100 includes receiving a control plane message at 104, calculating a resolved address at 110, and establishing a route at 120. However, this embodiment of method 100 includes an additional action. This embodiment of method 100 also includes, at 102, configuring a hub router to only selectively perform NHRP based resolution as claimed and described. Some spoke routers may have more resources than other routers, and thus a DMVPN administrator may wish to allow the hub router to interact with some spoke routers using the example methods while preventing the hub from interacting with other spoke routers using the example methods. Therefore, this embodiment of method 100 includes, at 102, configuring a hub router(s). Configuring a hub router may include configuring the router in the logical hub-and-spoke network to selectively calculate the resolved address for the unknown RPF neighbor using NHRP resolution and/or to selectively calculate the resolved address for the unknown RPF neighbor using a conventional technique that does not include using NHRP resolution.

Figure 4:
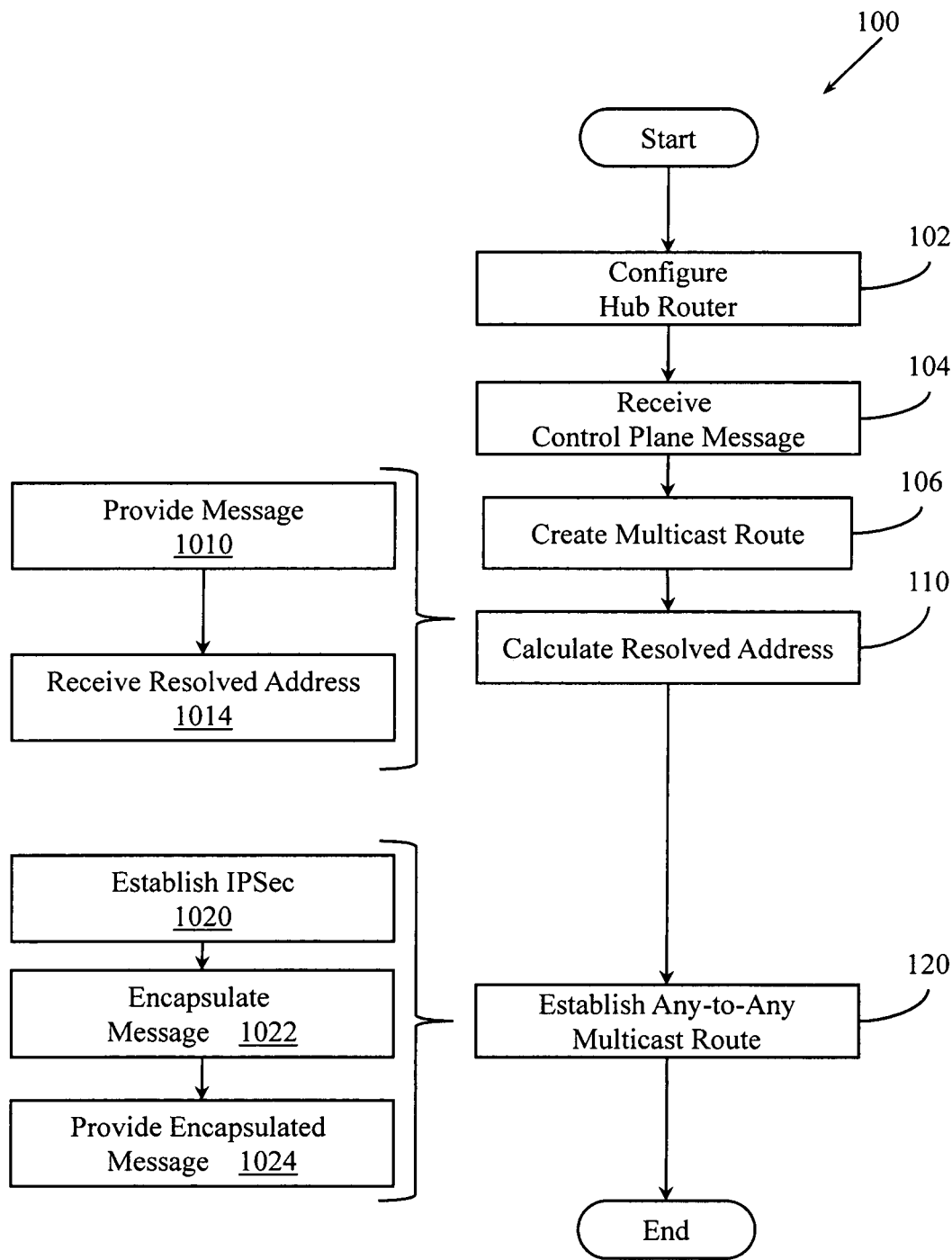
FIG. 4 illustrates an example method associated with any-to-any multicasting in a tunnel-based virtual private network.

FIG. 4 illustrates another embodiment of method 100. This embodiment includes the actions illustrated in FIG. 3 but shows additional detail for the actions at 110 and 120. This embodiment of method 100 illustrates that resolving the address at 110 may include, at 1010, providing an NHRP resolution request message to a hub and/or to a router associated with the sender of multicast data. Resolving the address at 110 may conclude, at 1014, by receiving the resolved address in the NHRP resolution response message.

This embodiment of method 100 illustrates that establishing the route at 120 may include several actions. For example, establishing the route at 120 may include selectively establishing IPsec at 1020. Establishing the route at 120 may also include, at 1022, encapsulating the message received at 104. Establishing the route at 120 may also include, at 1024, providing the encapsulated message to the router associated with the sender of multicast data. One skilled in the art will appreciate that method 100 may include a greater and/or lesser number of actions.

Figure 5:
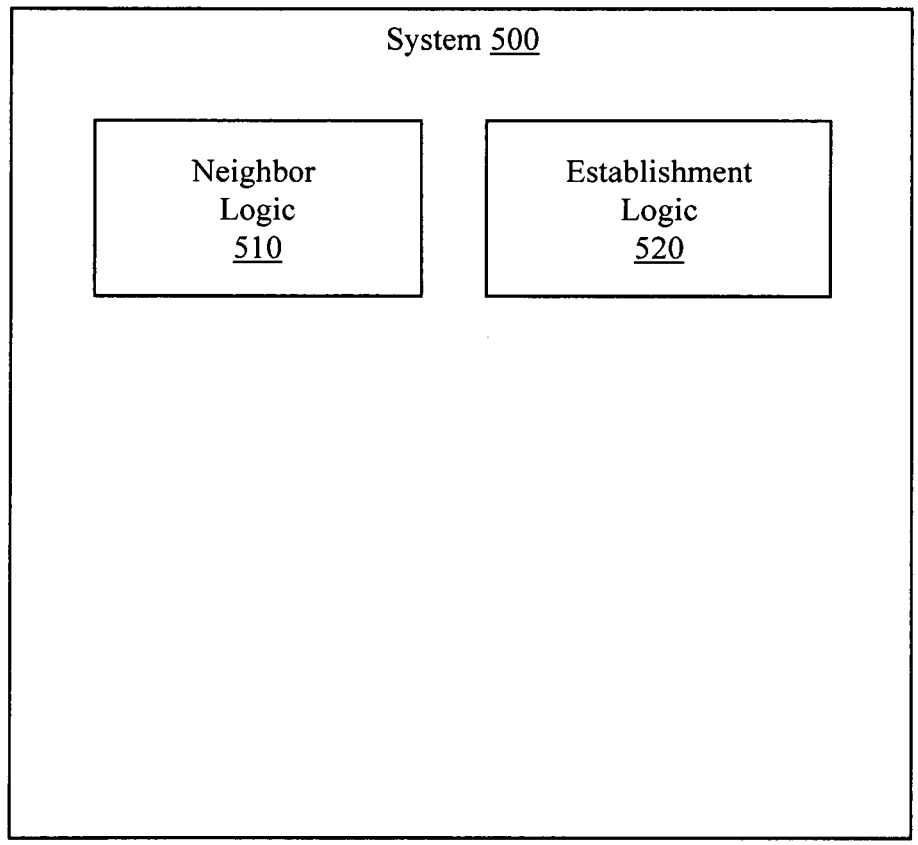
FIG. 5 illustrates an example system associated with any-to-any multicasting in a tunnel-based virtual private network.

FIG. 5 illustrates a system 500 that facilitates any-to-any multicasting in a tunnel-based VPN. System 500 includes a neighbor logic 510 to calculate the RPF neighbor for a spoke-to-spoke multicast route for a DMVPN that employs tunnel-based forwarding. In one example, the neighbor logic 510 calculates the RPF neighbor based on NHRP resolution triggered by control plane traffic.

There are at least two approaches that neighbor logic 510 can take to resolve an address and thus calculate the RPF neighbor. In a first example, the neighbor logic 510 may control the hub to provide the address. In another example, the neighbor logic 510 may control the hub to include another router to calculate the address. Thus, in one example, the neighbor logic 510 is to provide the control plane traffic to the hub in the hub-and-spoke network. The hub may then calculate the RPF neighbor using NHRP. The neighbor logic 510 may also receive the resolved address from the hub. In another example, the neighbor logic 510 is to provide the control plane traffic to the hub in the hub-and-spoke network. The hub may then provide the control plane message to the router associated with the sender of multicast data and control the router associated with the sender of multicast data to provide information concerning the RPF neighbor to the router associated with the receiver of multicast data. As in the first method, the neighbor logic 510 may then receive the information concerning the RPF neighbor, but in this example, it may receive the information concerning the RPF neighbor from the router associated with the sender of multicast data.

System 500 also includes an establishment logic 520 to establish the spoke-to-spoke multicast route between a receiver of multicast data and a source of multicast data. Note that the spoke-to-spoke multicasting route does not include a hub in the logical hub-and-spoke network. In one example, the establishment logic 520 is to selectively establish IPsec between the router associated with the receiver of multicast data and the router associated with the sender of multicast data. IPsec may not be desired in all instances, and thus establishment logic 520 only selectively establishes IPsec. Establishment logic 520 also provides the encapsulated control plane PIM message to the router associated with the sender of multicast data based, at least in part, on the information concerning the RPF neighbor. Note that the encapsulated control plane PIM message may be provided to an RPF neighbor that is not also a PIM neighbor. This differs from conventional systems.

Figure 6:
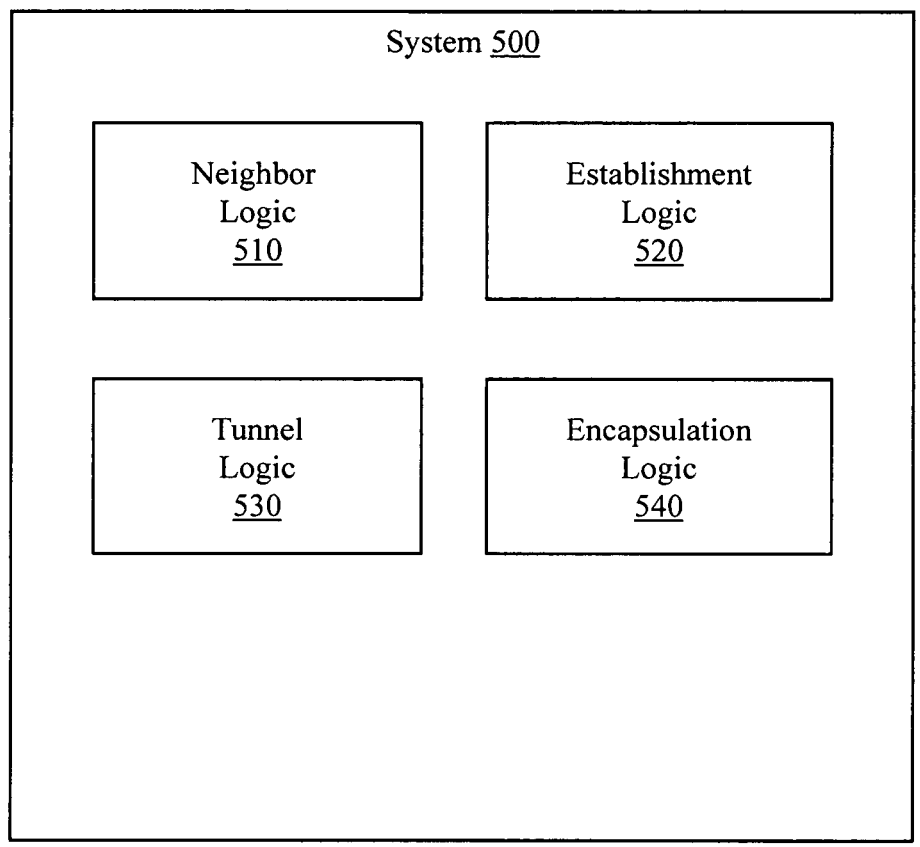
FIG. 6 illustrates an example system associated with any-to-any multicasting in a tunnel-based virtual private network.

FIG. 6 illustrates another embodiment of system 500. This embodiment of system 500 includes logics similar to those described in connection with the embodiment of FIG. 5. For example, this embodiment of system 500 includes a neighbor logic 510 and an establishment logic 520. However, this embodiment of system 500 also includes additional elements.

This embodiment of system 500 includes a tunnel logic 530. Tunnel logic 530 is to establish a tunnel between the receiver of multicast data and the sender of multicast data. Unlike conventional systems, the tunnel does not include the hub in the logical hub-and-spoke network. Different tunneling approaches may be employed. In one example, the tunnel-based forwarding employed by the DMVPN is based on GRE encapsulation.

Figure 7:
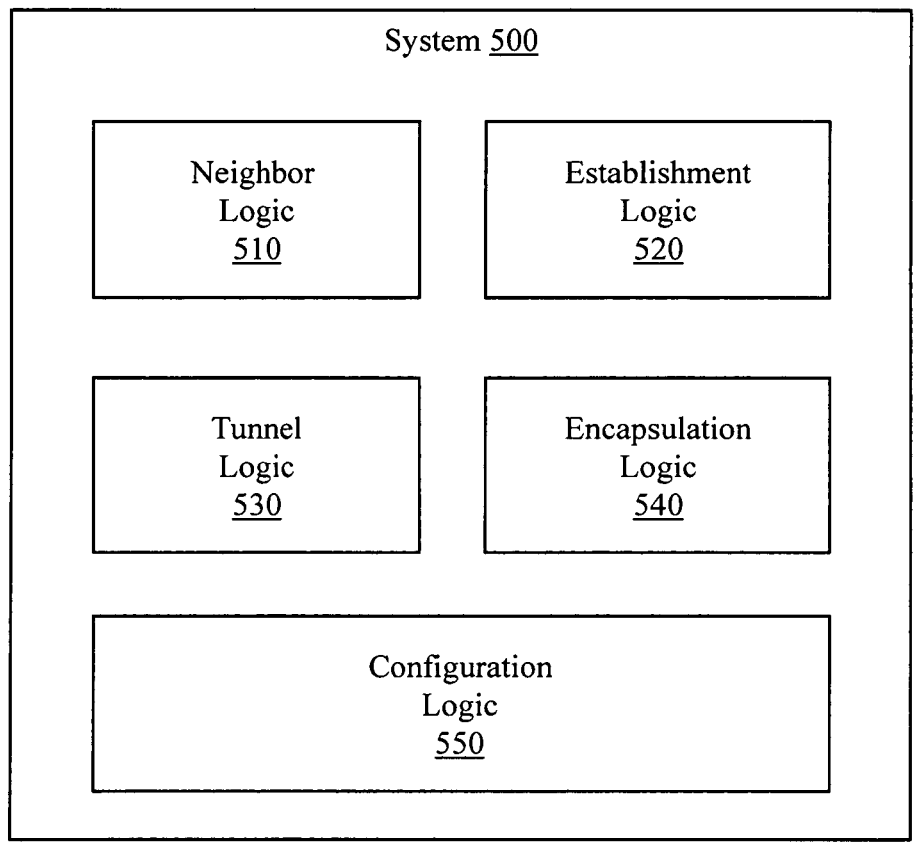
FIG. 7 illustrates an example system associated with any-to-any multicasting in a tunnel-based virtual private network.

This embodiment of system 500 also includes an encapsulation logic 540 to encapsulate the control plane PIM message into an encapsulated control plane message. When GRE based tunneling is employed, the encapsulation logic 540 is to perform GRE based encapsulation. Different control plane traffic may trigger the address resolution. The control plane traffic may be a control plane message including, for example, a PIM join group message, an IGMP join group message, and so on. Thus, in different examples and/or instances, the encapsulation logic 540 may encapsulate PIM messages, IGMP messages, and so on FIG. 7 illustrates another embodiment of system 500. This embodiment of system 500 includes elements similar to those described in connection with the embodiment of FIG. 6. For example, this embodiment of system 500 includes a neighbor logic 510, an establishment logic 520, a tunnel logic 530, and an encapsulation logic 540. However, this embodiment of system 500 also includes an additional element.

This embodiment of system 500 includes a configuration logic 550. Configuration logic 550 allows an administrator (e.g., DMVPN network administrator) to control whether the hub will interact with spoke routers using functionality provided by system 500. Not all spoke routers may be suitable for use with system 500 performing NHRP based resolution. Thus, configuration logic 550 may selectively configure a hub to selectively calculate the resolved address for the unknown RPF neighbor using NHRP resolution when interacting with certain spokes but may selectively configure the hub to use a conventional technique that does not include using NHRP resolution when interacting with certain other spokes.

Figure 8:
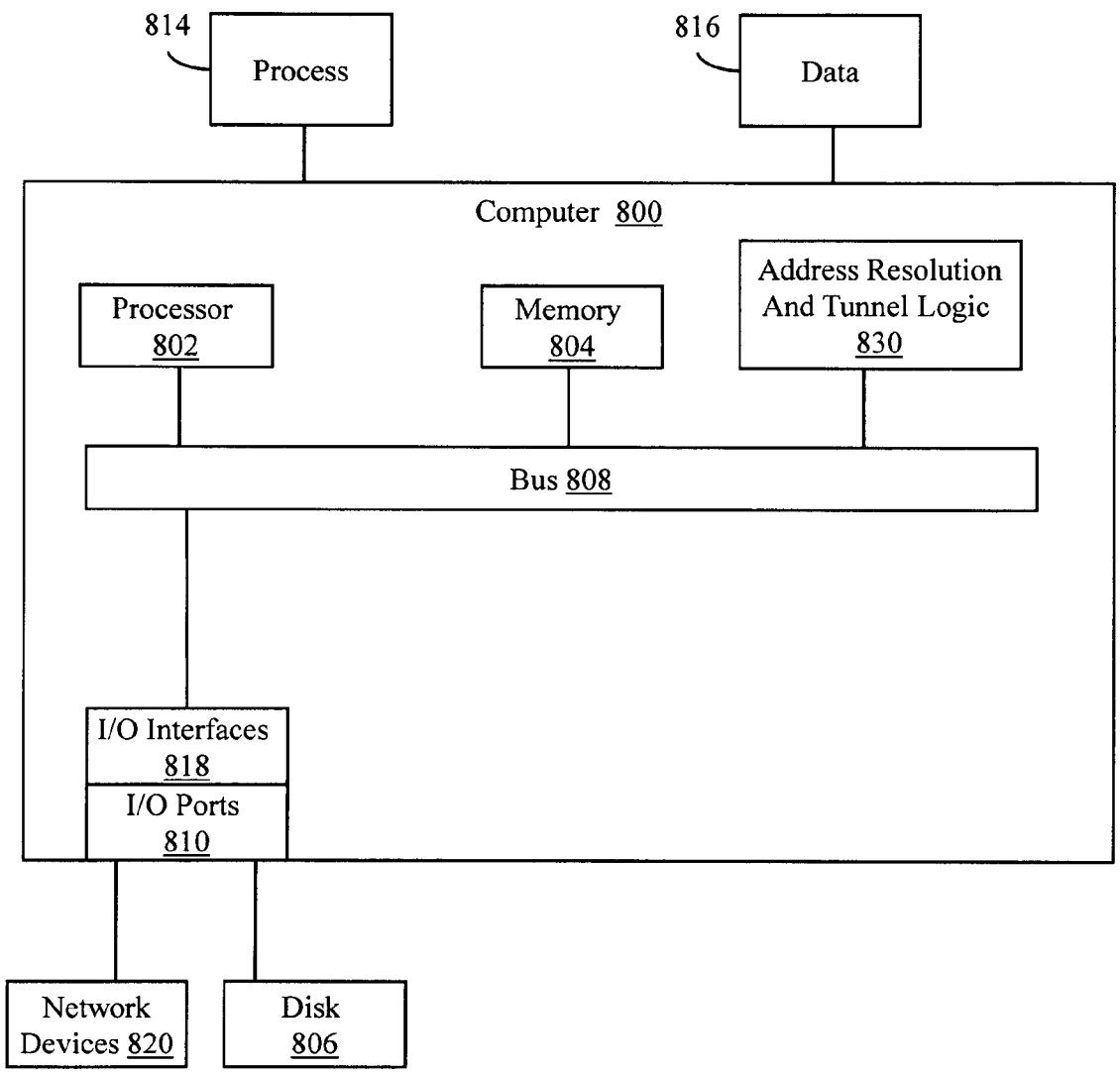
FIG. 8 illustrates an example computing environment in which example systems and methods, and equivalents, may operate any-to-any multicasting in a tunnel-based virtual private network.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include an address resolution and tunnel logic 830 configured to facilitate any-to-any multicasting in a tunnel-based forwarding logical hub-and-spoke network. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

Thus, logic 830 may provide means (e.g., hardware, software, firmware) for calculating the RPF neighbor for a multicast route based on NHRP resolution that is triggered by control plane traffic. Note that the multicast route is a spoke-to-spoke multicast route associated with a logical hub-and-spoke network that employs tunnel-based forwarding. Note also that the multicast route is not to include the hub from the logical hub-and-spoke network. In another example, logic 830 may provide means (e.g., hardware, software firmware) for utilizing NHRP to support any-to-any multicasting in a tunnel-based forwarding logical hub-and-spoke network. In this embodiment an NHRP resolution request is triggered based on control plane traffic (e.g., join group message).

The different means may be implemented as computer executable instructions that are presented to computer 800 as data 816 that are temporarily stored in memory 804 and then executed by processor 802. The different means may also be implemented as, for example, an ASIC.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, read only memory (ROM), programmable ROM (PROM), and so on. Volatile memory may include, for example, random access memory (RAM), synchronous RAM (SRAM), dynamic RAM (DRAM), and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a digital versatile disk (DVD) ROM drive, a Blu-Ray drive, an HD-DVD drive, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., peripheral component interconnect express (PCIE), 1394, universal serial bus (USB), Ethernet). The bus 808 can be types including, for example, a memory bus, a memory controller, a peripheral bus, an external bus, a crossbar switch, and/or a local bus.

The computer 800 may interact with input/output devices via the input/output (i/o) interfaces 818 and the i/o ports 810. I/o devices may be, for example, a keyboard, a microphone, a pointing and selection device, cameras, video cards, displays, the disk 806, the network devices 820, and so on. The i/o ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a local area network (LAN), a wide area network (WAN), and other networks.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein (e.g., neighbor logic, tunnel logic), includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   determining an address for an unresolved reverse path forwarding (RPF) neighbor in a multicasting route in a logical hub-and-spoke network that employs tunnel-based forwarding based on receiving control plane traffic comprising one or more protocol independent multicast (PIM) join group messages or one or more Internet Group Management Protocol (IGMP) messages; and
   establishing an any-to-any multicast tunnel and any-to-any multicast forwarding via the any-to-any multicast tunnel, where the any-to-any multicast forwarding does not include a hub in the logical hub-and-spoke network;
   where the any-to-any multicast forwarding is configured for use to send multicast data to a plurality of recipients.

2. The computer-readable medium of claim 1, where the any-to-any multicast forwarding is a spoke-to-spoke multicasting route that connects a receiver of multicast data located behind a first spoke router to a sender of multicast data located behind a second spoke router, where the receiver of multicast data and the sender of multicast data are members of a dynamic multipoint virtual private network (DMVPN).

3. The computer-readable medium of claim 2, where the tunnel-based forwarding is Generic Routing Encapsulation (GRE) based tunneling.

4. The computer-readable medium of claim 1, where a resolved address is calculated using next hop resolution protocol (NHRP).

5. The computer-readable medium of claim 2, where the method includes: receiving a control plane message associated with establishing the spoke-to-spoke multicasting route.

6. The computer-readable medium of claim 5, where the control plane message is a join group message.

7. The computer-readable medium of claim 6, where the join group message is one of: a protocol independent multicast (PIM) join group message, and an Internet Group Management Protocol (IGMP) join group message.

8. The computer-readable medium of claim 4, where calculating a resolved address for an unknown RPF neighbor includes:
   sending a NHRP message to the hub in the logical hub-and-spoke network; and
   receiving the resolved address from the hub in an NHRP resolution response message, where the NHRP message is multicast-specific.

9. The computer-readable medium of claim 4, where calculating a resolved address for an unknown RPF neighbor includes:
   sending a NHRP message to the hub in the logical hub-and-spoke network;
   controlling the hub to forward the NHRP message to a router associated with the sender of multicast data;
   controlling the router associated with the sender of multicast data to provide the resolved address to a router associated with the receiver of multicast data; and
   receiving the resolved address from the router associated with the sender of multicast data.

10. The computer-readable medium of claim 9, where establishing the any-to any multicast forwarding includes:
    updating a multicast route with incoming interface that connects to the resolved address of the RPF neighbor;
    selectively establishing Internet Protocol Security (IPsec) between the router associated with the receiver of multicast data and the router associated with the sender of multicast data;
    encapsulating a join group message into an encapsulated join group message; and
    providing the encapsulated join group message to the router associated with the sender of multicast data based, at least in part, on the resolved address.

11. The computer-readable medium of claim 1, where the method includes:
    configuring one or more hub routers in the logical hub-and-spoke network to calculate a resolved address for the unknown RPF neighbor using next hop resolution protocol (NHRP) resolution;
    configuring the one or more hub routers in the logical hub-and-spoke network to calculate the resolved address for the unknown RPF neighbor using a conventional technique that does not include using next hop resolution protocol (NHRP) resolution.

12. The computer-readable medium of claim 11, including:
    configuring the one or more hub routers to selectively provide the resolved address to the spoke router associated with the receiver, based on the capacity of the spoke router associated with the sender.

13. A system, comprising:
    one or more processors;
    a neighbor logic to calculate a reverse path forwarding (RPF) neighbor for a spoke-to-spoke multicast route for a dynamic multipoint virtual private network (DMVPN), where the neighbor logic calculates the RPF neighbor based on NHRP resolution based on receiving control plane traffic comprising one or more protocol independent multicast (PIM) join group messages or one or more Internet Group Management Protocol (IGMP) messages; and
    an establishment logic to establish an any-to-any multicast tunnel comprising the spoke-to-spoke multicast route between a receiver of multicast data and a source of multicast data, and to establish any-to-any multicast forwarding via the any-to-any multicast tunnel, where the spoke-to-spoke multicasting route does not include a hub in a logical hub-and-spoke network;
    where the any-to-any multicast forwarding is configured for use to send multicast data to a plurality of recipients.

14. The system of claim 13, including a tunnel logic to establish a tunnel between the receiver of multicast data and the sender of multicast data, where the tunnel does not include the hub in the logical hub-and-spoke network.

15. The system of claim 14, where the neighbor logic is to: send a NHRP resolution request message to the hub in the hub-and spoke network; and receive a resolved address from the hub.

16. The system of claim 14, where the neighbor logic is to:
provide a control plane message to the hub in the hub-and-spoke network;
control the hub to provide the control plane message to a router associated with the sender of multicast data;
control the router associated with the sender of multicast data to provide information concerning the RPF neighbor to a router associated with the receiver of multicast data; and
send information concerning the RPF neighbor from the router associated with the sender of multicast data.

17. The system of claim 16, including an encapsulation logic to encapsulate the control plane message into an encapsulated control plane message, and where the establishment logic is to:
selectively establish Internet Protocol Security (IPsec) between the router associated with the receiver of multicast data and the router associated with the sender of multicast data; and
provide the encapsulated control plane message to the router associated with the sender of multicast data based, at least in part, on the information concerning the RFP neighbor.

18. The system of claim 13, including a configuration logic to selectively configure the hub in the logical hub-and-spoke network and to selectively calculate a resolved address for the unknown RPF neighbor using next hop resolution protocol (NHRP) resolution.

19. The system of claim 17, where the tunnel-based forwarding employed by the hub-and-spoke network is based on generic routing encapsulation (GRE), where the control plane message is one of a protocol independent multicast (PIM) join group message and an Internet Group Management Protocol (IGMP) join group message, and where the NHRP message is multicast specific.

20. A method, comprising:
determining an address for an unresolved reverse path forwarding (RPF) neighbor in a multicasting route in a logical hub-and-spoke network that employs tunnel-based forwarding based on receiving control plane traffic comprising one or more protocol independent multicast (PIM) join group messages or one or more Internet Group Management Protocol (IGMP) messages; and
establishing an any-to-any multicast tunnel and any-to-any multicast forwarding via the any-to-any multicast tunnel, where the any-to-any multicast forwarding does not include a hub in the logical hub-and-spoke network;
where the any-to-any multicast forwarding is configured for use to send multicast data to a plurality of recipients;
wherein the method is performed by one or more processors.

21. The method of claim 20, where the any-to-any multicast forwarding is a spoke-to-spoke multicasting route that connects a receiver of multicast data located behind a first spoke router to a sender of multicast data located behind a second spoke router, where the receiver of multicast data and the sender of multicast data are members of a dynamic multipoint virtual private network (DMVPN).

22. The method of claim 21, where the tunnel-based forwarding is Generic Routing Encapsulation (GRE) based tunneling.

23. The method of claim 20, where a resolved address is calculated using next hop resolution protocol (NHRP).

24. The method of claim 21, further comprising: receiving a control plane message associated with establishing the spoke-to-spoke multicasting route.

25. The method of claim 24, where the control plane message is a join group message.

26. The method of claim 25, where the join group message is one of: a protocol independent multicast (PIM) join group message, and an Internet Group Management Protocol (IGMP) join group message.

27. The method of claim 23, where calculating a resolved address for an unknown RPF neighbor comprises:
sending a NHRP message to the hub in the logical hub-and-spoke network;
receiving the resolved address from the hub in an NHRP resolution response message, where the NHRP message is multicast-specific.

28. The method of claim 23, where calculating a resolved address for an unknown RPF neighbor comprises:
sending a NHRP message to the hub in the logical hub-and-spoke network;
controlling the hub to forward the NHRP message to a router associated with the sender of multicast data;
controlling the router associated with the sender of multicast data to provide the resolved address to a router associated with the receiver of multicast data;
receiving the resolved address from the router associated with the sender of multicast data.

29. The method of claim 28, where establishing the any-to any multicast forwarding comprises:
updating a multicast route with incoming interface that connects to the resolved address of the RPF neighbor;
selectively establishing Internet Protocol Security (IPsec) between the router associated with the receiver of multicast data and the router associated with the sender of multicast data;
encapsulating a join group message into an encapsulated join group message;
providing the encapsulated join group message to the router associated with the sender of multicast data based, at least in part, on the resolved address.

30. The method of claim 20, further comprising:
configuring one or more hub routers in the logical hub-and-spoke network to calculate a resolved address for the unknown RPF neighbor using next hop resolution protocol (NHRP) resolution;
configuring the one or more hub routers in the logical hub-and-spoke network to calculate the resolved address for the unknown RPF neighbor using a conventional technique that does not include using next hop resolution protocol (NHRP) resolution.

31. The method of claim 30, further comprising:
configuring the one or more hub routers to selectively provide the resolved address to the spoke router associated with the receiver, based on the capacity of the spoke router associated with the sender.

* * * * *